US009418631B2

(12) United States Patent
Cheng

(10) Patent No.: US 9,418,631 B2
(45) Date of Patent: Aug. 16, 2016

(54) DISPLAY CONTROL APPARATUS AND METHOD AND IMAGE PROCESSING METHOD

(75) Inventor: Kun-Nan Cheng, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 273 days.

(21) Appl. No.: 13/479,383

(22) Filed: May 24, 2012

(65) Prior Publication Data

US 2012/0299986 A1 Nov. 29, 2012

(30) Foreign Application Priority Data

May 25, 2011 (TW) ............................ 100118243 A

(51) Int. Cl.

| | |
|---|---|
| ***G09G 5/02*** | (2006.01) |
| ***G09G 5/00*** | (2006.01) |
| ***G06F 3/038*** | (2013.01) |
| ***G09G 5/391*** | (2006.01) |

(52) U.S. Cl.

CPC ................ *G09G 5/391* (2013.01); *G09G 5/005* (2013.01); *G09G 2360/02* (2013.01); *G09G 2370/12* (2013.01)

(58) Field of Classification Search

CPC .... G09G 5/391; G09G 2360/02; G09G 5/005

USPC ................................................... 345/690–691

See application file for complete search history.

(56) References Cited

U.S. PATENT DOCUMENTS

| | | | | |
|---|---|---|---|---|
| 2011/0149032 | A1* | 6/2011 | Choi et al. | 348/43 |
| 2011/0164076 | A1* | 7/2011 | Lee | G09G 3/3406 345/691 |
| 2012/0033039 | A1* | 2/2012 | Sasaki et al. | 348/43 |
| 2012/0127193 | A1* | 5/2012 | Bratt et al. | 345/590 |

* cited by examiner

*Primary Examiner* — Temesghen Ghebretinsae
*Assistant Examiner* — Kwin Xie
(74) *Attorney, Agent, or Firm* — WPAT, PC; Justin King

(57) ABSTRACT

A display control apparatus is capable of reducing image scaling times, maintaining image quality, and extending a turn-on time of a pair of 3D glasses. The display control apparatus includes a data processing unit and a timing generating unit. The data processing unit provides an image frame comprising a valid data region, which is larger than a visual region of a display panel. The timing generating unit generates an output timing signal according to a relative position of the visual region corresponding to the valid data region, so that a partial region of the valid data region corresponds to the visual region of the display panel. The partial region of the valid data region is displayed in the visual region of the display panel according to the output timing signal.

16 Claims, 12 Drawing Sheets

DISPLAY CONTROL APPARATUS AND METHOD AND IMAGE PROCESSING METHOD

CROSS REFERENCE TO RELATED PATENT APPLICATION

This patent application is based on Taiwan, R.O.C. patent application No. 100118243 filed on May 25, 2011.

FIELD OF THE INVENTION

The present invention relates to a display technology field, and more particularly, to a display control apparatus for reducing image scaling and method thereof.

BACKGROUND OF THE INVENTION

In the display technology field, a scaler, widely applied to a display control apparatus, e.g., a television (TV) or a display, is capable of appropriately scaling images and displayed contents having different resolutions from image sources and displaying the image contents on the display apparatus completely. When a resolution of image content from an image source becomes higher and higher, the resolution needs to be reduced to conform to a display panel having a lower resolution, i.e., the image frame needs to be scaled to conform to the display panel having the lower resolution; however, the resolution of the image content may be undesirably affected, especially content having a high degree of detail, including small characters, may become blurred after having been scaled in this manner.

As multimedia developed, in addition to a personal computer (PC), other types of multimedia devices also serve as image sources of the display apparatus, e.g., a DVD player or video game system. Most players can define output resolutions according to support ability of a transmission interface, but most users are unlikely to adjust the resolutions according to different contents. Therefore, when a resolution of content is different from an output resolution of a player (e.g., the output resolution of the player is 1920×1080 pixels, and the resolution of the content is 1366×768 pixels), the player needs to first scale the content to the output resolution, and then transmit the content to a display end via a transmission interface supporting the output resolution as shown in FIG. 1. However, when the resolution of a panel at the display end is different from the output resolution of the player, the content needs to be scaled again to conform to the resolution of the panel before it is displayed at the display end. Image quality displayed on the resultant panel may be damaged, for example, images may exhibit pixel loss or degradation when the content is scaled multiple times in this manner.

In addition, in applications having three-dimensional (3D) display, a pair of active 3D glasses are turned on and turned off to conform to left and right frames of the display control apparatus to achieve the desired 3D display effect. Since each image frame comprises a data enable (DE) region and a blanking region, in the prior art, the pair of 3D glasses is only turned on during a scan interval corresponding to the blanking region of the image frame after the DE region (i.e., to-be-displayed content) of an image frame is completely displayed in order to properly display the complete display content. When the turn-on time of the pair of 3D glasses is increased, the frame luminance perceived by a user is typically increased. In addition, since a liquid crystal display (LCD) apparatus has a long response time of liquid crystal elements, a long turn-on time of the pair of 3D glasses can stabilize the liquid crystal elements to avoid liquid crystal elements not responding in order to achieve an accurate status before the pair of 3D glasses is turned off. Therefore, the turn-on time of the pair of 3D glasses influences the 3D display effect. However, when the scaler of the display control apparatus downscales an image from a high-resolution image source to the lower resolution of the panel, the blanking region of the image is correspondingly scaled down, so that the turn-on time of the pair of 3D glasses is reduced, which is unbeneficial to the 3D display effect of the display.

SUMMARY OF THE INVENTION

In view of the foregoing issues, one object of the present invention is to provide a display control apparatus and method thereof capable of reducing image scaling times while maintaining image quality.

Another object of the present invention is to provide a display control apparatus and method thereof capable of selecting a display region in a source image without performing scaling by conforming to a resolution of a display panel so as to maintain a definition of image content.

Yet another object of the present invention is to provide a display control apparatus and method thereof capable of performing display according to a predetermined display timing signal to extend a turn-on time of a pair of 3D glasses thereby improving 3D display effect.

According to an embodiment of the present invention, a method for displaying an image frame on a display panel comprises providing the image frame comprising a valid data region that is larger than a visual region of the display panel; generating an output timing signal according to a relative position of the visual region corresponding to the valid data region, so that a partial region of the valid data region corresponds to the visual region of the display panel; and outputting the image frame and the output timing signal to the display panel, so as to display the partial region of the valid data region in the visual region of the display panel according to the output timing signal.

According to another embodiment of the present invention, a display control apparatus for controlling a display panel to display an image frame comprises a data processing unit, for providing the image frame comprising a valid data region that is larger than a visual region of the display panel; and a timing generating unit, for generating an output timing signal according to a relative position of the visual region corresponding to the valid data region, so that a partial region of the valid data region corresponds to the visual region of the display panel; wherein the partial region of the valid data region is displayed in the visual region of the display panel according to the output timing signal.

According to yet another embodiment of the present invention, a method comprises providing a source image frame comprising a source valid data region; generating an output image frame according to an output resolution and the source image frame, so that the source valid data region forms a part of the an output valid data region of the output image frame, with the output resolution being larger than that of the source valid data region; generating selection information for indicating a position of the source valid data region in the output valid data region; and outputting the output image frame and the selection information.

DETAILED DESCRIPTION OF THE PREFERRED EMBODIMENT

Figure 1:
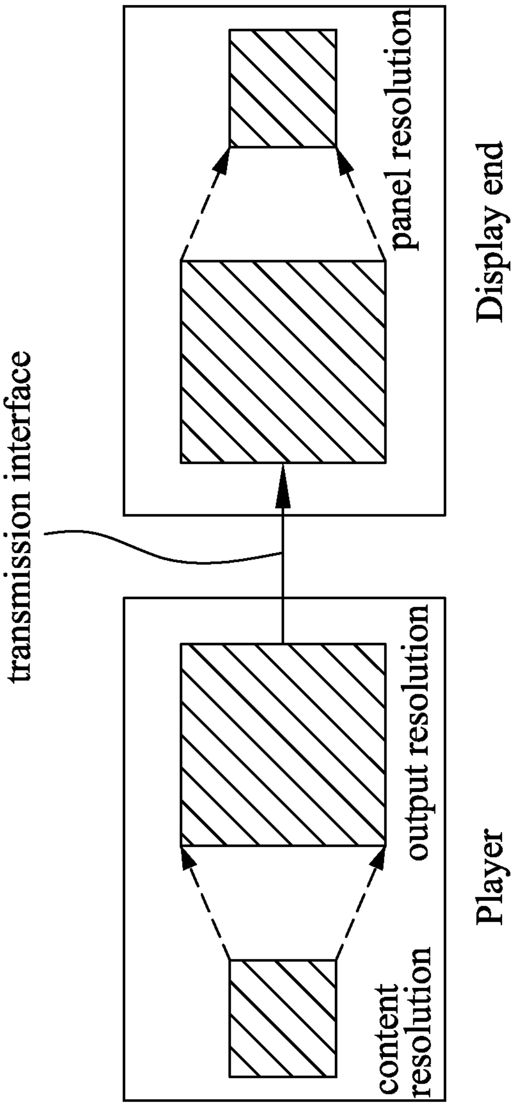
FIG. 1 is a schematic diagram of image scaling performed on a player end and a display end.
Figure 2A:
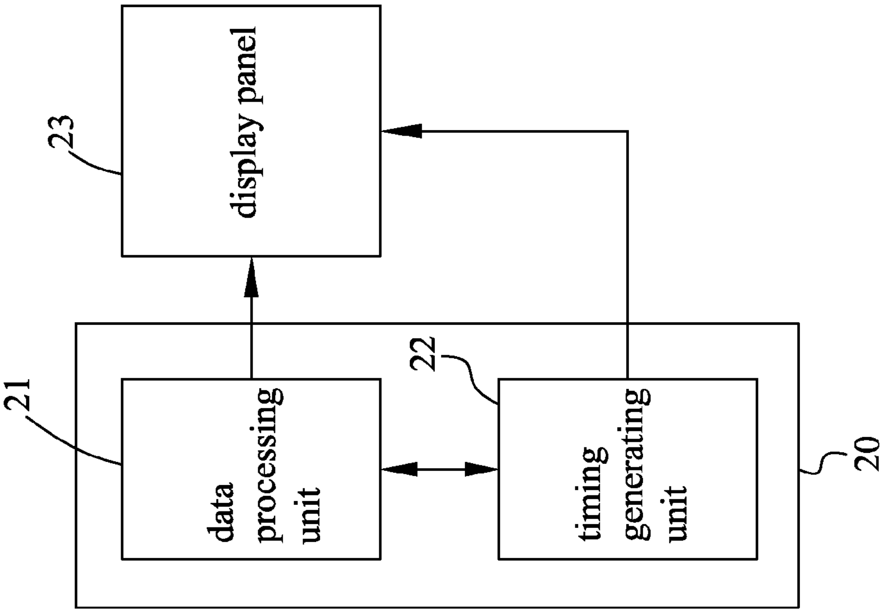
FIG. 2A is a block diagram of a display control apparatus in accordance with an embodiment of the present invention.
Figure 3B:
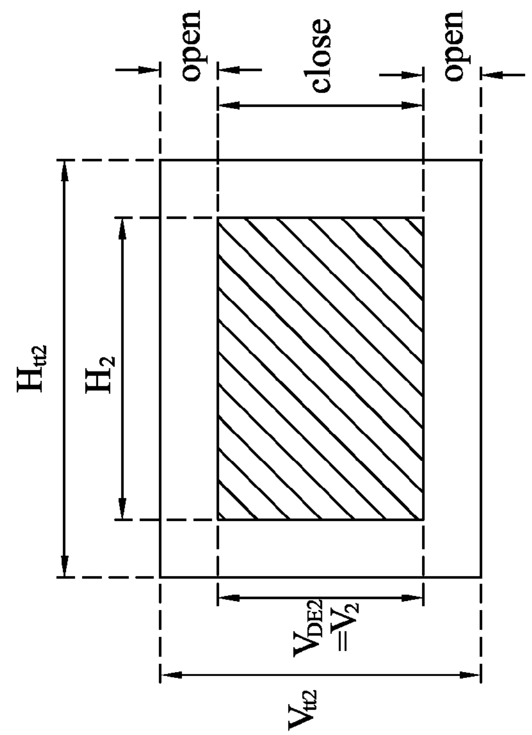
FIG. 3A and FIG. 3B are schematic diagrams of the display manner as illustrated in FIG. 2A and a conventional display manner, respectively.
Figure 3A:
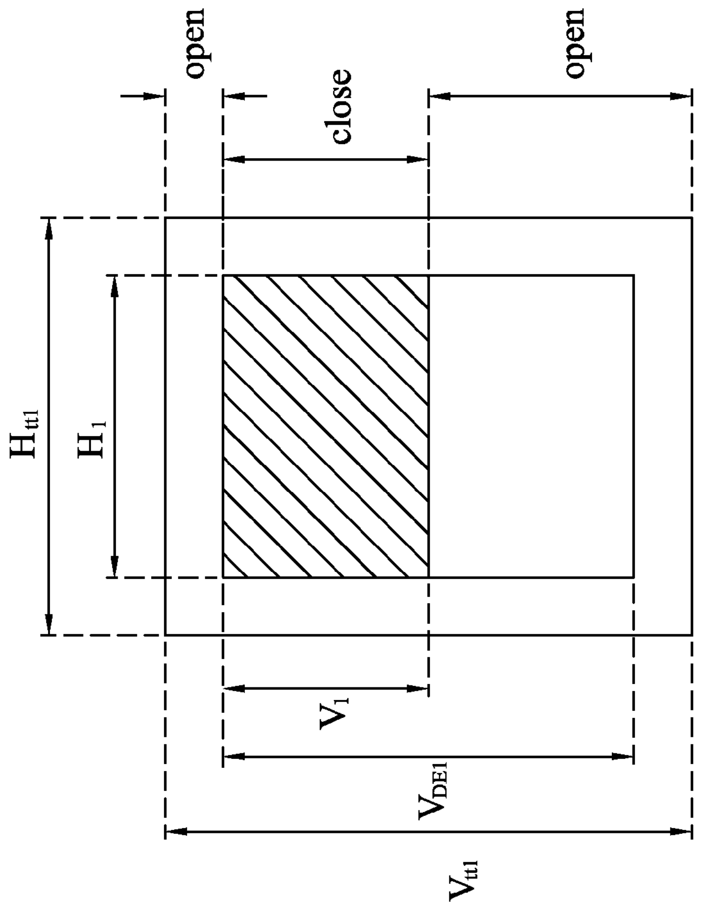

FIG. 2A is a block diagram of a display control apparatus in accordance with an embodiment of the present invention. A display control apparatus 20 comprises a data processing unit 21 and a timing generating unit 22. The data processing unit 21 receives an image frame that is temporarily stored in a buffer. The image frame comprises a valid data region and an invalid data region, and the valid data region is larger than a visual region (i.e., a region practically visible to a user) of a display panel 23. The valid data region can be a DE region, and the invalid data region can be a blanking region. The timing generating unit 22 generates an output timing signal to the display panel 23, so that a partial region (referred to as a first partial region in the following description) of the valid data region corresponds to the visual region of the display panel 23. Therefore, when the data processing unit 21 outputs the image frame to the display panel 23 for display, the display panel 23 displays the first partial region in the visual region according to the output timing signal. FIG. 3A is a schematic diagram of an $H_{tt1}\times V_{tt1}$ frame (including $V_{tt1}$ scan lines each having $H_{tt1}$ pixels) displayed in the foregoing display manner. The frame comprises an $H_1\times V_{DE1}$ valid data region (i.e., the data enable region), and the remaining part is an invalid data region (i.e., the blanking region). The panel can only display an $H_1\times V_1$ region (i.e., the first partial region represented by diagonal lines) in the visual region. As observed in FIG. 3A, the number of scan lines in the first partial region is smaller than that of the scan lines in the valid data region (i.e., $V_1$ is smaller than $V_{DE1}$). FIG. 3B shows a schematic diagram of an $H_{tt2}\times V_{tt2}$ frame in a conventional display manner. An $H_2\times V_2$ region ($H_2=H_1$, $V_2=V_{11}$) is displayed in the visual region of the panel, and is the valid data region of the $H_{tt2}\times V_{tt2}$ frame (i.e., $V_{DE2}=V_2$). By comparing FIG. 3A with FIG. 3B, a vertical resolution $V_{DE1}$ of the valid data region in FIG. 3A is larger than a vertical resolution $V_{DE2}$ of the valid data region in FIG. 3B. It is to be noted that, although a horizontal resolution of the valid data region in FIG. 3A is equal to that of the valid data region in FIG. 3B (i.e., $H_2=H_1$), $H_1$ may also be defined as being larger than $H_2$ in other embodiments. In order to let the display panel 23 perform the display manner shown in FIG. 3A, the timing generating unit 22 needs to generate a specific output timing signal, e.g., a specific data enable signal corresponding to the valid data region in FIG. 3A, and the number of scan lines corresponding to the specific data enable signal is larger than that of scan lines of the visual region of the panel. For example, when the visual region of the panel has a resolution of 1366×768, the display control unit 21 generates an output timing signal conforming to the valid data region having a resolution of 1366×900 or 1920×1080.

Preferably, when the display panel 23 supports 3D display, the timing generating unit 22 further generates a glasses control signal, so that a pair of 3D glasses is turned on during a scan interval corresponding to a remaining region of the valid data region excluding the first partial region. Compared to the prior art, a turn-on time of the pair of 3D glasses can be extended via the approach in this embodiment. The pair of 3D glasses can be turned only on during a scan interval of the blanking region in the conventional display manner, and must be turned off during a scan interval of the entire valid data region as shown in FIG. 3B. However, according to FIG. 3A, in this embodiment, the pair of 3D glasses can be still turned-on during a scan interval of the remaining region of the valid data region excluding the first partial region. Therefore, as far as a proportion that the turn-on time of the pair of 3D glasses occupies a total scan interval of the frame is concerned, the proportion (i.e., $(V_{tt1}-V_1)/V_{tt1}$) in FIG. 3A is larger than the proportion (i.e., $(V_{tt2}-V_2)/V_{tt2}$ in FIG. 3B, where $V_{tt2}$ is smaller than $V_{tt1}$, $V_2=V_1$), so that the turn-on time of the pair of 3D glasses is longer in FIG. 3A than that in FIG. 3B with the same length of scan interval of the frame.

Figure 2B:
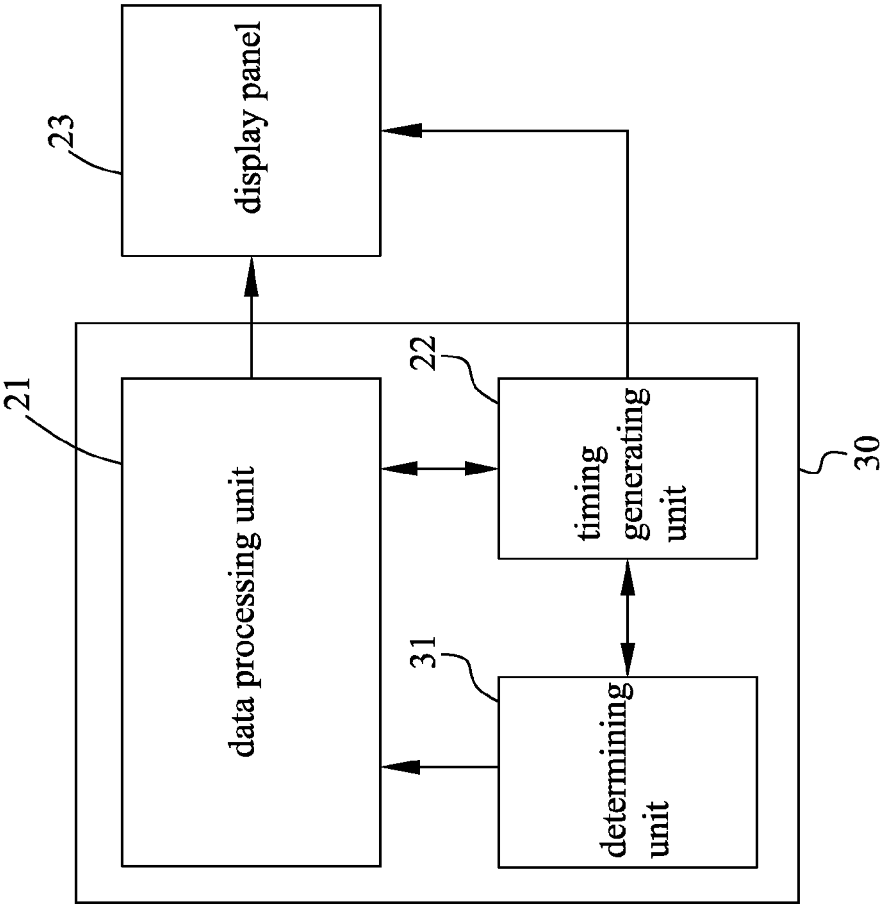
FIG. 2B is a block diagram of a display control apparatus in accordance with another embodiment of the present invention.

FIG. 2B is a block diagram of a display control apparatus in accordance with another embodiment of the present invention. Compared to FIG. 2A, the display control apparatus 30 in FIG. 2B further comprises a determining unit 31, for determining a relative position of the first partial region in the valid data region of the frame according to selection information, and generating corresponding position information to the timing generating unit 22. The timing generating unit 22 generates the corresponding output timing signal according to the position information, so that the first partial region can be accurately displayed in the visual region of the display panel 23. Generation of the corresponding output timing signal according to the position information is described in detail below. When the resolution of the valid data region of the frame is larger than that of the visual region of the display panel 23 (e.g., a maximum resolution supported by the visual region, or a user-defined resolution), the display control apparatus 30 achieves an effect of reducing image scaling times. For example, in FIG. 4A, since the resolution of the valid data region of the frame received by the data processing unit 21 is larger than that of the visual region of the panel, after the determining unit 31 selects the relative position (e.g., marked by diagonal lines) of the first partial region according to the selection information, the data processing unit 21 directly outputs the frame that is not scaled to the display panel 23, so that the first partial region is directly displayed in the visual region of the panel to maintain a definition of original source content. The prior art (e.g., FIG. 4B) requires that the received frame needs to be scaled, so that a down-scaled valid data region is displayed in the visual region of the panel, undesirably affecting the resultant definition of the display content.

Figure 4A:
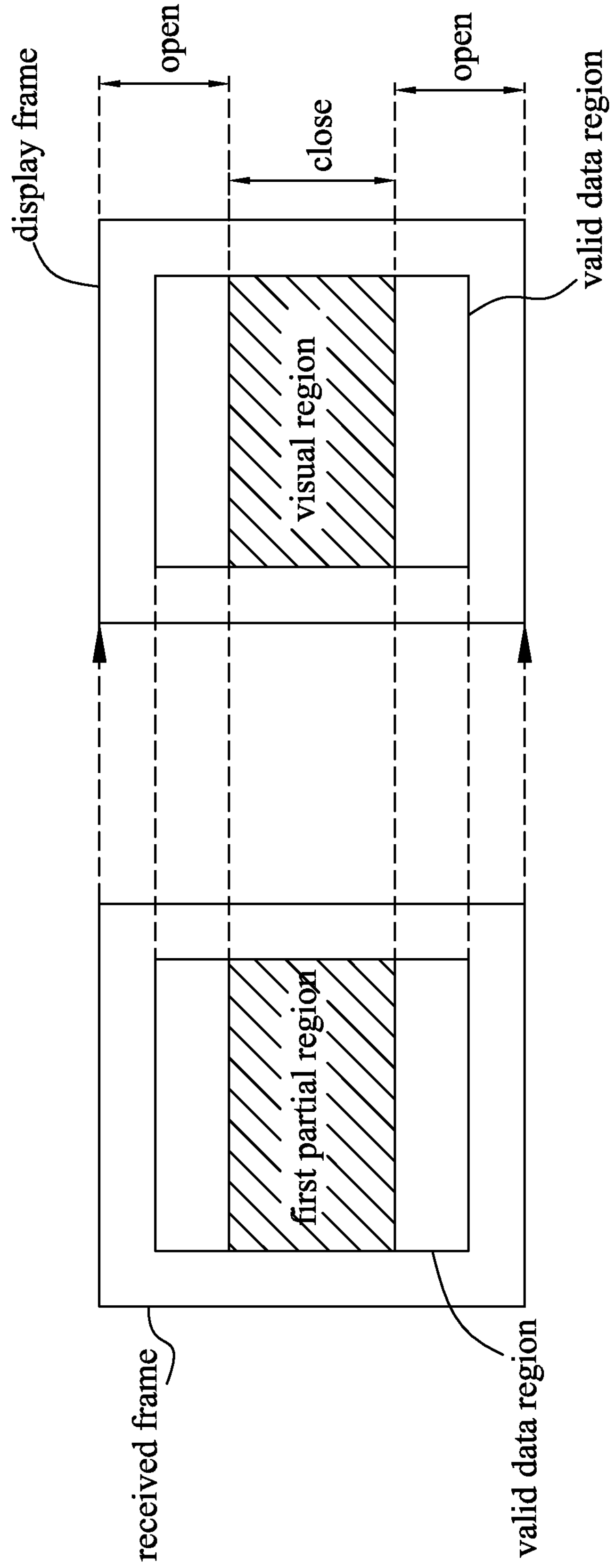
FIG. 4A and FIG. 4B are schematic diagrams of the display manner as illustrated in FIG. 2B and a conventional display manner, respectively.
Figure 4B:
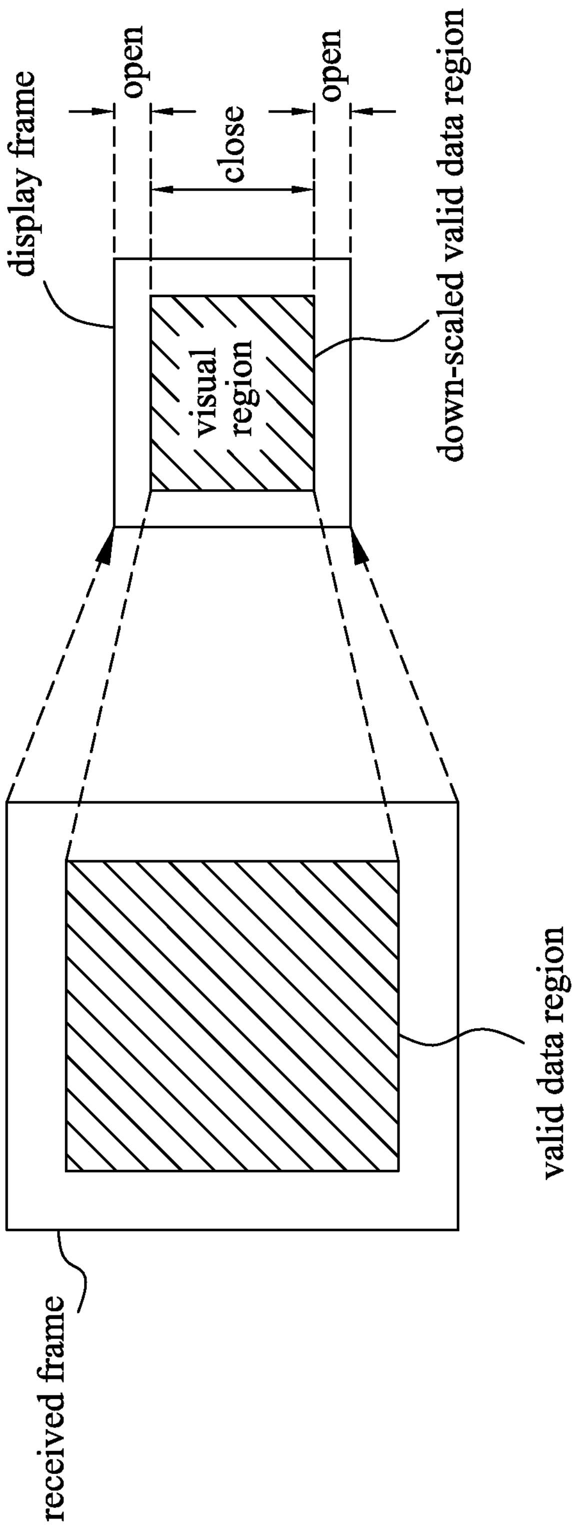

In this embodiment, when the display panel 23 supports 3D display, as observed in FIG. 4A and FIG. 4B, the turn-on time of the pair of 3D glasses is longer than in the prior art. Referring to FIG. 4A, according to a glasses control signal generated by the timing generating unit 22, the turn-on time of the pair of 3D glasses is defined as being within in a scan interval of the remaining region of the valid data region excluding the visual region of the panel. Referring to FIG. 4B, since the valid data region and the invalid data region are proportionally changed when image scaling is performed in the prior art, the proportion that the turn-on time of the pair of 3D glasses occupies the total scan interval of the frame is equal to that of the originally received frame. Therefore, the proportion that the turn-on time of the pair of 3D glasses occupies the total scan interval of the frame in FIG. 4A is larger than in FIG. 4B. In other words, compared to FIG. 4B, the turn-on time of the pair of 3D glasses is increased in FIG. 4A.

Figure 5:
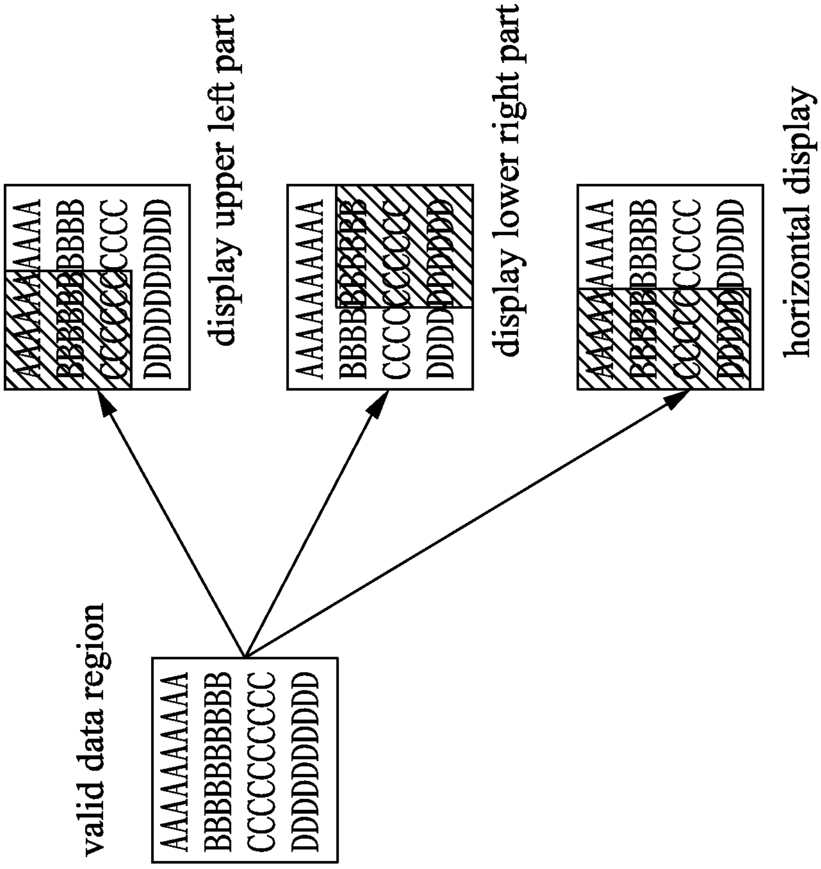
FIG. 5 is a schematic diagram of different selection parts in a valid data region as illustrated in FIG. 2B in accordance with an embodiment of the present invention.

More specifically, the foregoing selection information is user-inputted. For example, when the display panel 23 has a touch function or provides a user interface (e.g., on screen display (OSD)), the user can input the selection information via a touch manner or by operating the user interface to select a to-be-displayed region. Accordingly, when image content having a lot of details and small characters is observed, the user directly selects a favorite part to display without undesirably affect the definition due to image scaling. For example, referring to FIG. 5, the user can accurately display (without scaling) source images of different parts (e.g., the upper left part or lower right part) of the valid data region. When the display panel 23 supports a 90-degree rotation function, a horizontal display may be rotated to a vertical display as shown in FIG. 5 (it is to be noted that, the horizontal display and the vertical display may be performed in different valid data regions).

Figure 6:
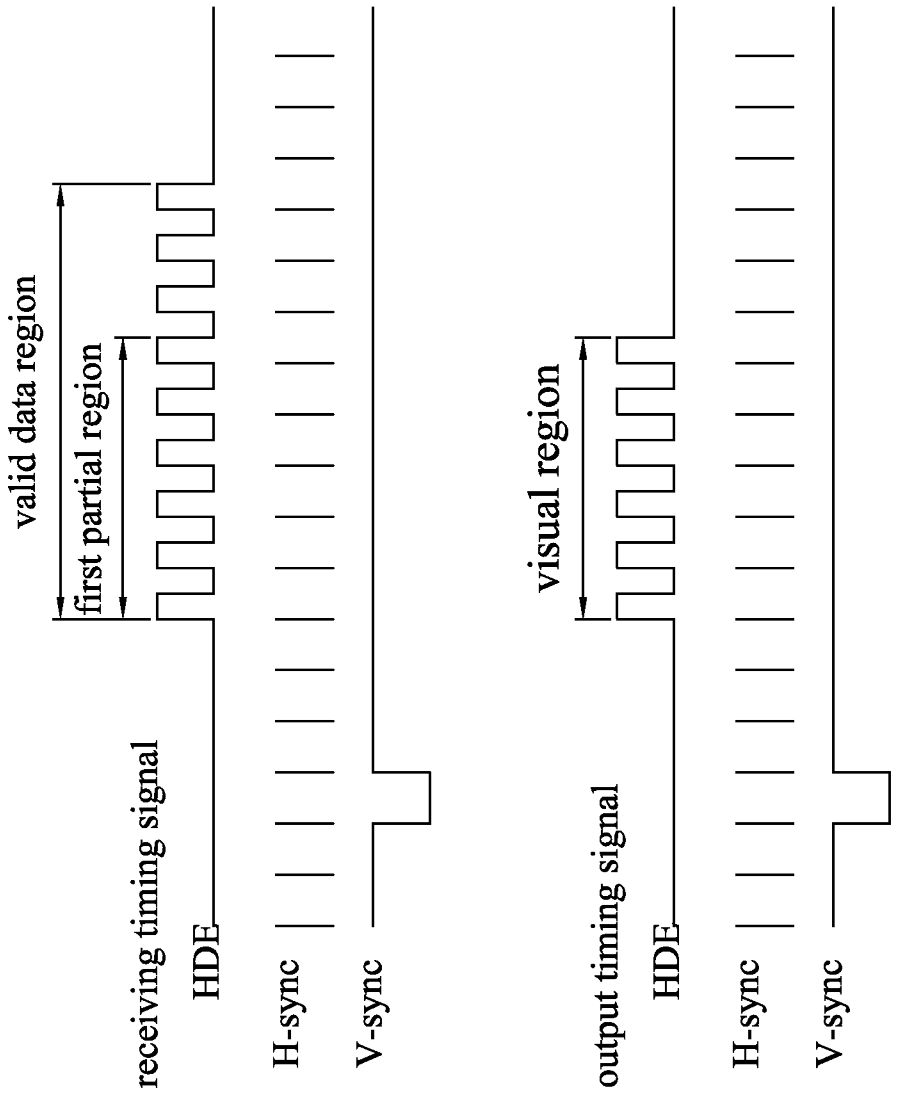
FIG. 6 is a schematic diagram of a first manner for a timing generating unit illustrated in FIG. 2A and FIG. 2B to generate an output timing signal in accordance with an embodiment of the present invention.

Two approaches for generating the output timing signal by the timing generating unit 22 are described below. The first approach is to generate a predetermined horizontal data enable (HDE) signal, and the number of scan lines corresponding to the HDE signal is determined according to the number of scan lines in the first partial region to achieve an effect that only a part (i.e., the first partial region) of the valid data region of the frame is displayed in the visual region of the panel. For example, the number of scan lines corresponding to the HDE signal is directly equal to that of the scan liens in the first partial region as shown in FIG. 6. The data processing unit 21 receives data of the frame according to a receiving timing signal, which comprises the HDE signal having each pulse corresponding to a scan line of the valid data region, a horizontal synchronization (H-sync) signal and a vertical synchronization (V-sync) signal. When the timing generating unit 22 generates the output timing signal, in addition to the H-sync signal and the V-sync signal, the timing generating unit 22 further shields a part of the HDE signal that originally corresponds to the valid data region of the whole frame, and only remains a part of the HDE signal corresponding to the first partial region as the HDE signal for display on the panel. Accordingly, the display panel 23 can display the first partial region in its visual region according to the modified HDE signal.

Figure 7:
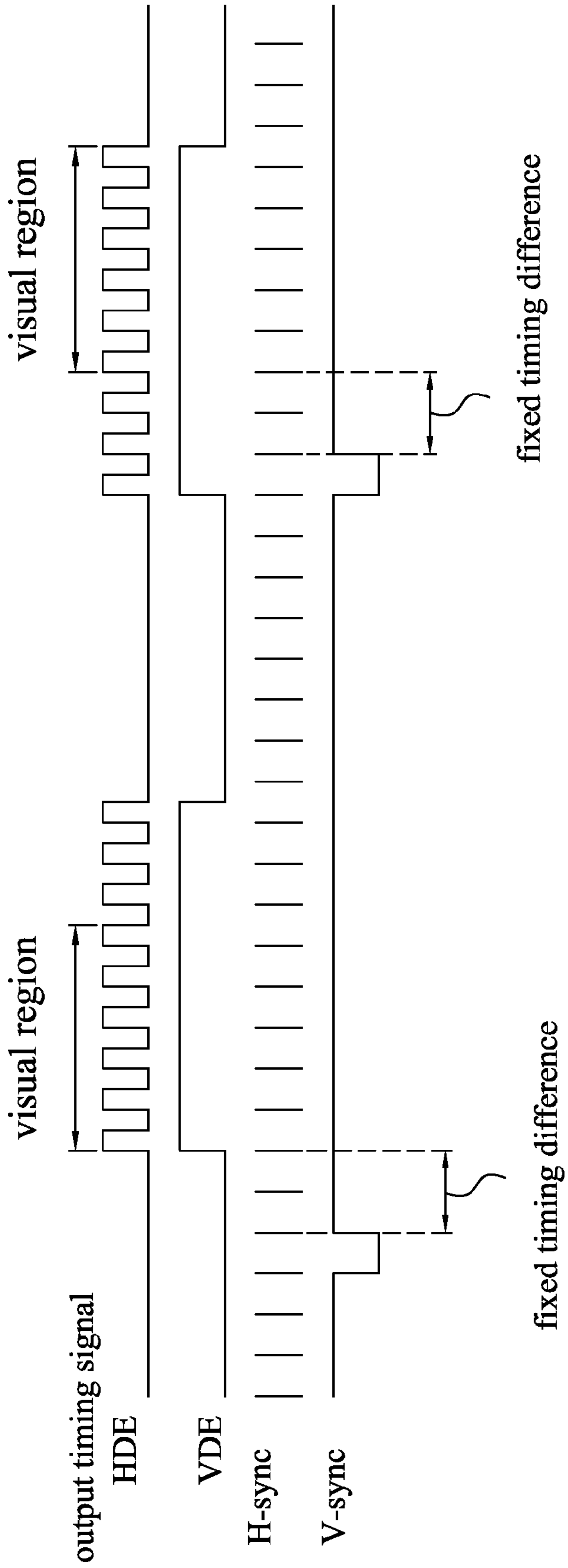
FIG. 7 is a schematic diagram of a second manner for a timing generating unit illustrated in FIG. 2A and FIG. 2B to generate an output timing signal in accordance with an embodiment of the present invention.

The second approach is to remain the received HDE signal without performing shielding, and to set a relative position of a start scan line of the visual region of the panel in the valid data region by adjusting timing between a vertical reference signal and the HDE signal. It is to be noted that, when the originally received timing signal received by the data processing unit 21 comprises a vertical data enable (VDE) signal (having each pulse corresponding to a whole valid data region), since a pulse start position of the VDE signal corresponds to a first pulse of the HDE signal, the relative position of the start scan line of the visual region of the panel in the valid data region is set by adjusting the timing between the vertical reference signal and the VDE signal. The vertical reference signal may be the V-sync signal or a vertical start pulse signal, which is a reference time point for displaying the frame. The second approach is applicable to a situation that there is a fixed timing difference between the start scan line position of the visual region of the panel and the vertical reference signal. In practical applications, the fixed timing difference is represented by the number of scan lines. Since the position information generated by the determining unit 31 records the relative position of the first partial region in the valid data region, i.e., it is determined in advance the relative position of the start scan line of the visual region of the panel in the valid data region, the timing generating unit 22 adjusts the relative timing between the vertical reference signal and the HDE signal (or the VDE signal) when the output timing signal is generated according to the position information, so that the fixed timing difference between the vertical reference signal and the predetermined start scan line position of the visual region of the panel is maintained, and thus the start scan line of the visual region of the panel can be indirectly set at the accurate relative position to accurately display the first partial region on the visual region of the panel. Referring to FIG. 7, the relative position of the visual region of the panel in the valid data region is changed for the reason that the user inputs different selection information, for example. Therefore, the timing generating unit 22 adjusts timing of the V-sync signal without shielding the HDE signal to maintain the fixed timing difference (a duration of two scan lines as shown in FIG. 7) between the V-sync signal and the predetermined start scan line position of the visual region of the panel, and thus accurately display the selected region in the visual region of the panel. The overmuch HDE signal is omitted by the display panel 23.

Figure 8:
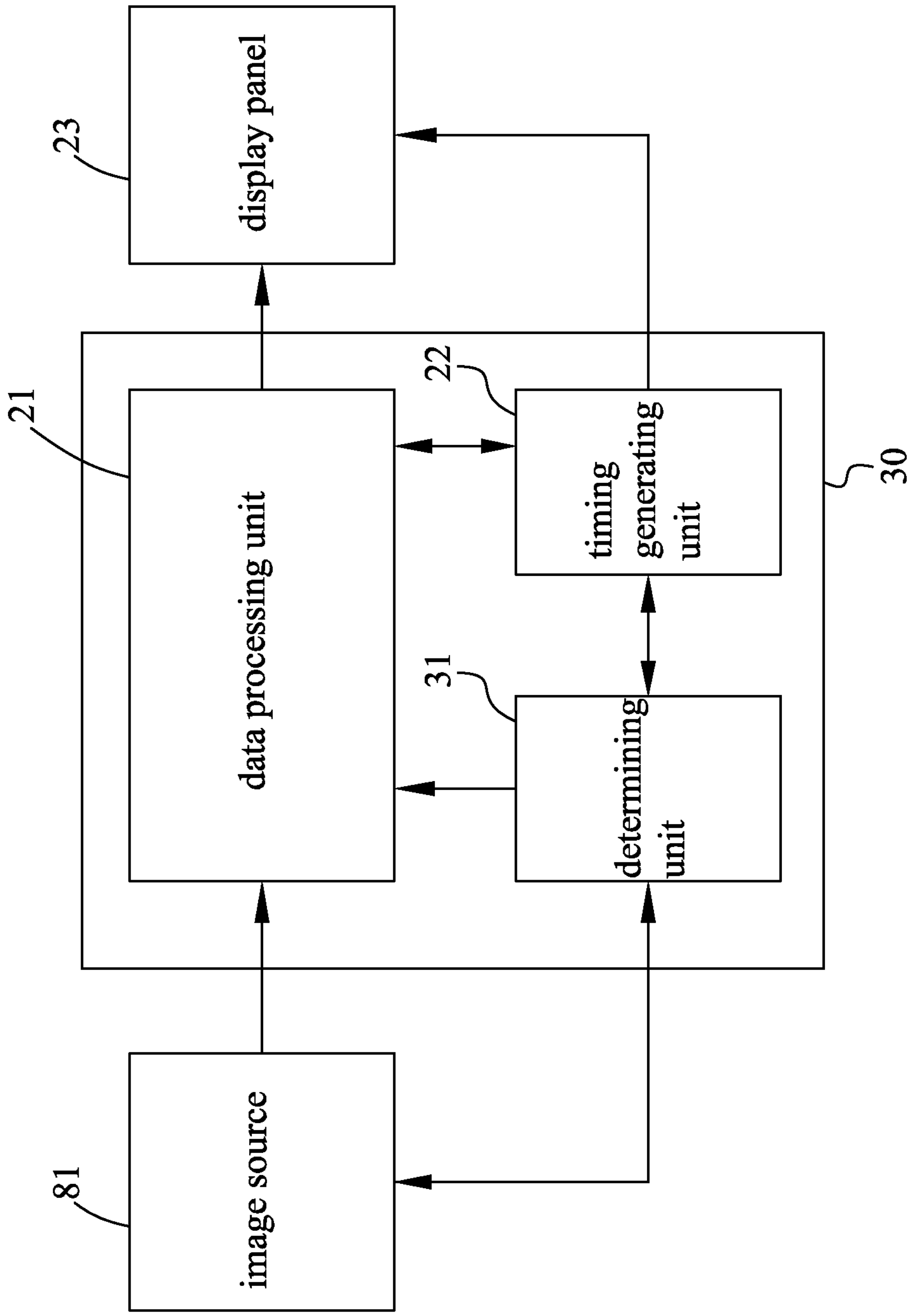
FIG. 8 is a block diagram of a display control apparatus in accordance with another embodiment of the present invention.
Figure 9:
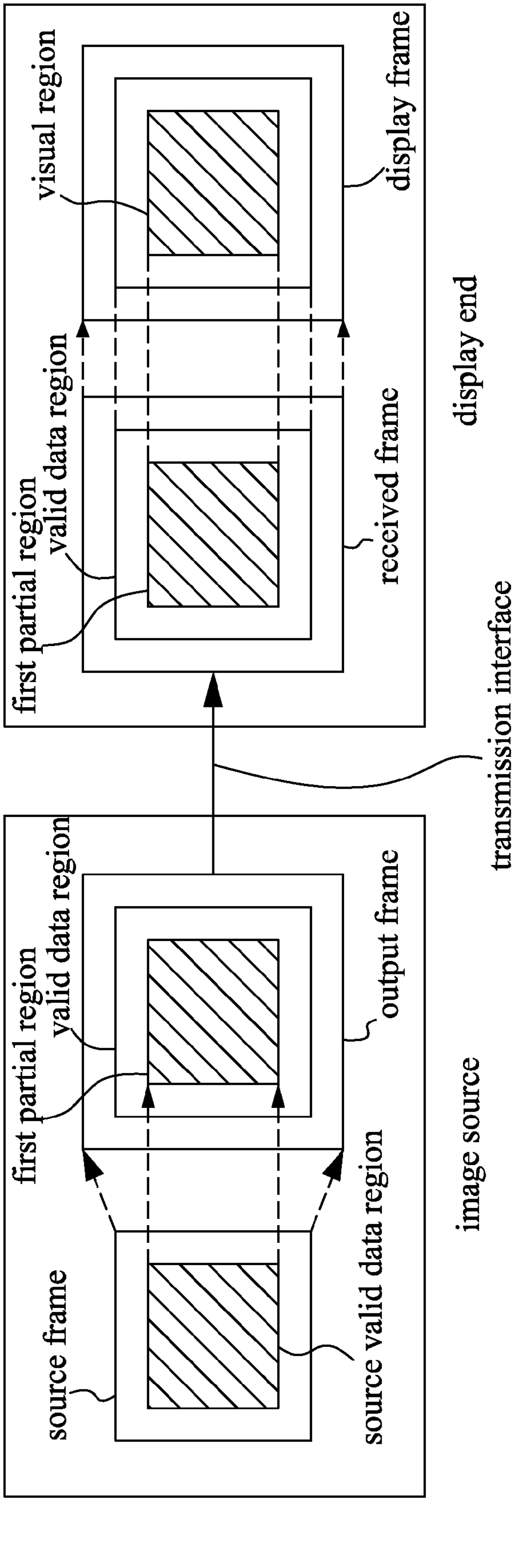
FIG. 9 is a schematic diagram of a display manner applied to the display control apparatus illustrated in FIG. 8.

In an embodiment, the frame received by the display control apparatus 30 and the selection information are provided by an image source as shown in FIG. 8. An image source 81 provides a frame to the data processing unit 21, and provides the selection information corresponding to the frame to the determining unit 31. The image source 81 can be a multimedia player, e.g., a DVD player. The image source 81 generates the frame and the corresponding selection information according to a source frame and an output resolution. The image source 81 comprises a transmission interface for transmitting the frame to the data processing unit 21, e.g., the transmission interface can be a Video Graphics Array (VGA) interface, a DisplayPort interface, an High-Definition Multimedia Interface (HDMI), a Digital Visual Interface (DVI), or a wireless interface. The output resolution is adopted by the image source 81 when transmitting the frame, and the transmission interface supports the output resolution. The source frame comprises a source valid data region (i.e., source image content) corresponding to the foregoing first partial region, and the resolution of the valid data region of the frame (i.e., the output frame of the image source 81, i.e., the frame received by the data processing unit 21) is equal to the output resolution and is larger than the resolution of the source valid data region as shown in FIG. 9. In other words, the embodiment illustrated in FIG. 8 is applied to a situation that the output resolution of the image source 81 is larger than that of the source image. It is to be noted that, as shown in FIG. 9, image data only exists in the first partial (represented by diagonal lines) in the valid data region of the frame, the remaining part of the valid data region of the frame presenting in conjunction with the output resolution contains no image data at all. When the frame is received at a display end (comprising the display control apparatus 30 and the display panel 23), the determining unit 31 determines the relative position of the first partial region in the valid data region according to the selection information provided by the image source 81, and the timing generating unit 22 generates the corresponding output timing signal to display the first partial region in the visual region of the panel as shown in FIG. 9.

More specifically, the image source 81 receives support mode information from the determining unit 31 to obtain a resolution supported by the visual region of the display panel 23. The support mode information and the foregoing selection information can be transmitted and received via a predetermined communication mechanism between the image source 81 and the display control apparatus 30, e.g., the predetermined communication mechanism is a display data channel (DDC), a DisplayPort auxiliary channel, and the like. Referring to FIG. 9, when the image source 81 determines that the resolution of the visual region of the display panel 23 is equal to that of the source valid data region of the source frame according to the support mode information, the image source 81 directly regards the source valid data region as the first partial region without performing scaling when the frame to be outputted to the data processing unit 21 is generated according to the source frame. Since the resolution of the first partial region of the frame received at the display end is equal to that of the visual region of the panel, scaling need not be performed to directly display the frame. In the prior art, the source image is scaled to conform to the output resolution of the image source 81, and is again scaled to conform to the resolution of the visual region of the panel at the display end. Therefore, compared to the prior art, the embodiment provided in FIG. 8 is capable of avoiding image scaling to improve resultant image display quality.

When the image source 81 determines that the resolution of the visual region of the display panel 23 is different from that of the source valid data region according to the support mode information, two approaches are introduced below.

The first approach is to perform scaling via the image source 81. When the frame to be outputted to the data processing unit 21 is generated according to the source frame, the image source 81 performs image scaling on the source valid data region to generate the first partial region, so that the resolution of the first partial region is equal to that of the visual region of the panel. Accordingly, the received frame is directly displayed at the display end without performing scaling.

The second approach is to perform scaling at the display end. When the frame to be outputted to the data processing unit 21 is generated according to the source frame, the image source 81 directly regards the source valid data region as the first partial region. When the data processing unit 21 receives the frame, image scaling is performed on the first partial region to convert the resolution of the first partial region to the resolution of the visual region of the panel to display.

Image scaling is only performed once via either the first approach or the second approach, so that the method provided by the embodiment is capable of achieving the effect of reducing image scaling at a lower computational cost, since image scaling is performed twice in the prior art.

Figure 10:
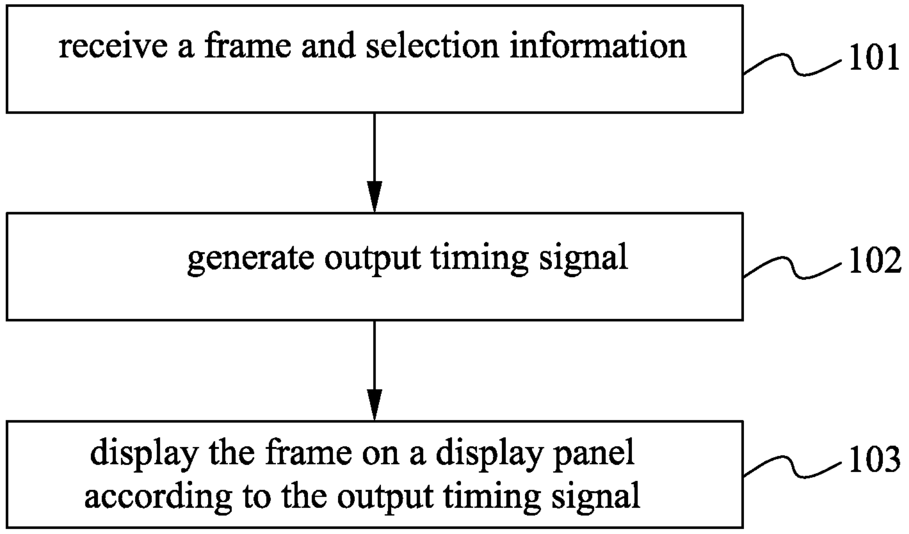
FIG. 10 is a flow chart of a display method in accordance with an embodiment of the present invention.

FIG. 10 is a flow chart of a display method in accordance with an embodiment of the present invention. The display method is applied to a display control apparatus 30 in FIG. 2B. In Step 101, a frame and selection information are received. The frame comprises a valid data region comprising a partial region (i.e., the foregoing first partial region), and the selection information is for determining a relative position of the first partial region in the valid data region. The selection information is user-inputted or is provided by an image source.

In Step 102, an output timing signal is generated according to the relative position of the first partial region in the valid data region. For example, two generating approaches are described below.

According to the first approach, the output timing signal comprises an HDE signal, and the number of scan lines corresponding to the HDE signal is determined according to the number of scan lines in the first partial region, which is described in detail in the previous description and shall not be described for brevity.

According to the second approach, the output timing signal comprises a vertical reference signal and an HDE signal (or a VDE signal). Relative timing between the vertical reference signal and the HDE signal (or the VDE signal) is determined according to the foregoing relative position. The vertical reference signal can be a V-sync signal or a vertical start pulse signal, which is described in detail in the previous description and shall not be described for brevity.

In Step 103, the frame is displayed on a display panel according to the output timing signal. The first partial region is displayed in a visual region of the display panel, and the number of scan lines in the first partial region is smaller than that of the scan lines in the valid data region.

Preferably, when the display panel supports 3D display, the display method in FIG. 10 further comprises a step (not shown) of providing a glasses control signal, so that a pair of 3D glasses is turned on during a scan interval corresponding to the remaining region of the valid data region excluding the first partial region. Accordingly, compared to the prior art, a turn-on time of the pair of 3D glasses is extended, which is described in detail in the previous description and shall not be described for brevity.

Figure 11:
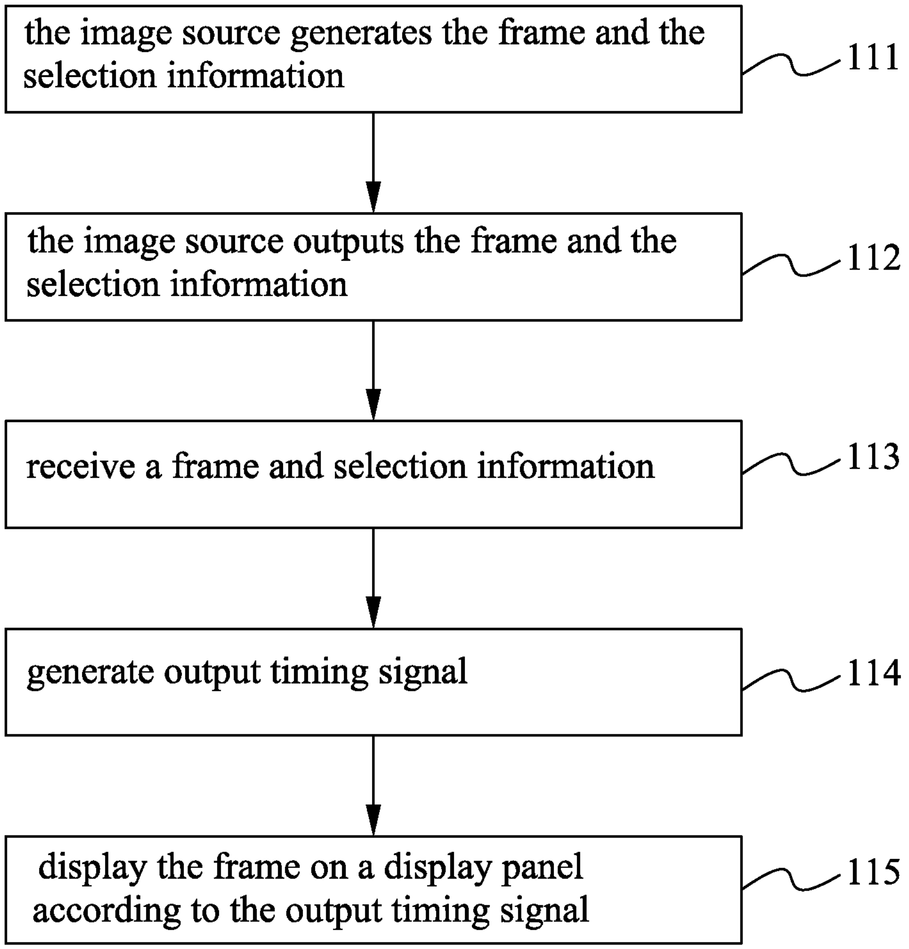
FIG. 11 is a flow chart of a display method in accordance with another embodiment of the present invention.

FIG. 11 shows a flow chart of a display method in accordance with another embodiment of the present invention, and the display method is applied to the display control apparatus illustrated in FIG. 8. In this embodiment, a frame and selection information received at the display end are provided by an image source. In Step 111, the image source generates the frame and the selection information according to a source frame and an output resolution. The source frame comprises a source valid data region corresponding to the foregoing first partial region, and a resolution of the valid data region of the frame is equal to the output resolution and is larger than the resolution of the source valid data region. In Step 112, the image source outputs the frame and the selection information, and the frame is outputted according to the output resolution. The following processes, Step 113 to Step 115, are equivalent to Step 101 to Step 103 in FIG. 10. In this embodiment, when the resolution of the visual region of the panel is equal to that of the source valid data region, in Step 111, when the image source generates the frame, the source valid data region is regarded as the first partial region to avoid image scaling, which is described in detail in the previous description and shall not be described for brevity. When the resolution of the visual region of the panel is not equal to that of the source valid data region, in Step 111, when the image source generates the frame, image scaling is performed on the source valid data region to generate the first partial region, so that the resolution of the first partial region is equal to that of the visual region of the panel. Accordingly, the number of image scaling is reduced in this embodiment than in the prior art, which is described in detail in the previous description and shall not be described for brevity.

Another situation exists when the resolution of the visual region of the panel is not equal to that of the source valid data region. In Step 111, when the image source generates the frame, the source valid data region is regarded as the first partial region, and between Step 113 and Step 114, the flow further comprises a step (not shown) of performing image scaling on the first partial region to convert the resolution of the first partial region to that of the visual region of the panel, so that the number of image scaling is reduced compared to the prior art, which is described in detail in the previous description and shall not be described for brevity.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A display method, for displaying a frame on a display panel, comprising:

providing the frame comprising a valid data region that is larger than a visual region of the display panel, wherein a partial region of the valid data region corresponds to the entire visual region, and the partial region has a same number of scan lines as the visual region;

generating an output timing signal according to a relative position of the visual region corresponding to the valid data region, such that said output timing signal corresponds to quantity of scan lines that only link to the partial region of the valid data region;

outputting the frame and the output timing signal to the display panel so as to display the partial region of the valid data region in the visual region of the display panel according to the output timing signal; and providing a glasses control signal, so that a pair of 3D glasses is turned on during a scan interval corresponding to a remaining region of the valid data region excluding the partial region.

2. The method as claimed in claim 1, further comprising:

providing selection information to determine the relative position of the visual region corresponding to the valid data region.

3. The method as claimed in claim 2, wherein the selection information is inputted by a user.

4. The method as claimed in claim 2, wherein the frame and the selection information are provided by an image source, and the display method further comprises:

generating the frame and the selection information according to a source frame and an output resolution, wherein the source frame comprises a source valid data region corresponding to the partial region, and a resolution of the valid data region of the frame is equal to the output resolution, and is larger than a resolution of the source valid data region; and outputting by the image source the frame and the selection information.

5. The method as claimed in claim 4, wherein when a resolution of the visual region of the display panel is equal to the resolution of the source valid data region, the image source regards the source valid data region as the partial region when the frame is generated.

6. The method as claimed in claim 4, wherein when the resolution of the visual region of the display panel is not equal to the resolution of the source valid data region, the image source performs image scaling on the source valid data region to generate the partial region when the frame is generated, so that a resolution of the partial region is equal to the resolution of the visual region.

7. The method as claimed in claim 4, wherein when the resolution of visual region of the display panel is not equal to the resolution of the source valid data region, the image source regards the source valid data region as the partial region when the frame is generated, and the method further comprises:

performing image scaling on the partial region, so that the resolution of the partial region is converted to the resolution of the visual region.

8. The method as claimed in claim 1, wherein the output timing signal comprises a horizontal data enable (HDE) signal, and the number of scan lines corresponding to the HDE signal is determined according to the number of scan lines in the partial region.

9. The method as claimed in claim 1, wherein the output timing signal comprises a vertical reference signal and a vertical data enable (VDE) signal, the VDE signal corresponds to the valid data region, and relative timing between the vertical reference signal and the VDE signal is determined according to the relative position of the visual region corresponding to the valid data region.

10. The method as claimed in claim 1, wherein the output timing signal comprises a vertical reference signal and an HDE signal, the HDE signal corresponds to the number of scan lines in the valid data region, and the relative timing between the vertical reference signal and the HDE signal is determined according to the relative position of the visual region corresponding to the valid data region.

11. A display control apparatus, for controlling a display panel for displaying a frame, comprising:

a data processing unit, for providing the frame comprising a valid data region that is larger than a visual region of the display panel, wherein a partial region of the valid data region corresponds to the entire visual region, and the partial region has a same number of scan lines as the visual region; and a timing generating unit, for generating an output timing signal according to a relative position of the visual region corresponding to the valid data region, such that said output timing signal corresponds to quantity of scan lines that only link to the partial region of the valid data region;

wherein the partial region of the valid data region is displayed in the visual region of the display panel according to the output timing signal; and wherein when the display panel supports 3D display, the timing generating unit further generates a glasses control signal, so that a pair of 3D glasses is turned on during a scan interval corresponding to a remaining region of the valid data region excluding the partial.

12. The display control apparatus as claimed in claim 11, further comprising:

a determining unit, for determining the relative position of the visual region corresponding to the valid data region according to selection information.

13. The display control apparatus as claimed in claim 12, wherein an image source generates the frame and the selection information according to a source frame and an output resolution, and outputs the frame to the data processing unit according to the output resolution, the source frame comprises a source valid data region corresponding to the partial region, and a resolution of the valid data region of the frame is equal to the output resolution and is larger than a resolution of the source valid data region.

14. The display control apparatus as claimed in claim 13, wherein when a resolution of the visual region is equal to the resolution of the source valid data region, the image source regards the source valid data region as the partial region when the frame is generated.

15. The display control apparatus as claimed in claim 11, wherein the output timing signal comprises an HDE signal, and the number of scan lines corresponding to HDE signal is determined according to the number of scan lines in the partial region.

16. The display control apparatus as claimed in claim 11, wherein the output timing signal comprises a vertical reference signal and a VDE signal, the VDE signal corresponds to the valid data region, and relative timing between the vertical reference signal and the VDE signal is determined according to the relative position of the visual region corresponding to the valid data region.

* * * * *